US009890462B2

(12) United States Patent
Temme

(10) Patent No.: US 9,890,462 B2
(45) Date of Patent: Feb. 13, 2018

(54) CORROSION-PROTECTION SYSTEM FOR TREATING METAL SURFACES

(71) Applicant: HENKEL AG & CO. KGaA, Duesseldorf (DE)

(72) Inventor: Andreas Temme, Langenfeld (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/492,207

(22) Filed: Sep. 22, 2014

(65) Prior Publication Data

US 2015/0011445 A1 Jan. 8, 2015

Related U.S. Application Data

(63) Continuation of application No. PCT/EP2013/055074, filed on Mar. 13, 2013.

(30) Foreign Application Priority Data

Mar. 23, 2012 (DE) ........................ 10 2012 204 683

(51) Int. Cl.

| | |
|---|---|
| ***C10M 173/00*** | (2006.01) |
| ***C09K 3/00*** | (2006.01) |
| ***C23G 1/06*** | (2006.01) |
| ***B23K 35/22*** | (2006.01) |
| ***C23C 30/00*** | (2006.01) |
| ***C23F 11/00*** | (2006.01) |
| ***C10G 75/02*** | (2006.01) |
| ***C11D 11/00*** | (2006.01) |
| ***C23F 11/10*** | (2006.01) |
| ***C23G 1/26*** | (2006.01) |
| ***C11D 1/825*** | (2006.01) |
| ***C11D 3/00*** | (2006.01) |
| ***C11D 3/20*** | (2006.01) |
| ***C11D 3/36*** | (2006.01) |
| ***C11D 7/26*** | (2006.01) |
| ***C11D 7/32*** | (2006.01) |
| ***C11D 7/36*** | (2006.01) |
| ***C10M 173/02*** | (2006.01) |
| ***C11D 3/30*** | (2006.01) |
| ***C10M 141/06*** | (2006.01) |
| *C11D 1/722* | (2006.01) |

(52) U.S. Cl.

CPC .............. *C23F 11/00* (2013.01); *C10G 75/02* (2013.01); *C10M 141/06* (2013.01); *C10M 173/02* (2013.01); *C11D 1/8255* (2013.01); *C11D 3/0073* (2013.01); *C11D 3/2075* (2013.01); *C11D 3/30* (2013.01); *C11D 3/361* (2013.01); *C11D 7/265* (2013.01); *C11D 7/3209* (2013.01); *C11D 7/36* (2013.01); *C11D 11/0029* (2013.01); *C23F 11/10* (2013.01); *C23G 1/26* (2013.01); *C10M 2203/1025* (2013.01); *C10M 2203/1065* (2013.01); *C10M 2207/021* (2013.01); *C10M 2207/0406* (2013.01); *C10M 2207/121* (2013.01); *C10M 2207/125* (2013.01); *C10M 2207/2805* (2013.01); *C10M 2209/104* (2013.01); *C10M 2209/105* (2013.01); *C10M 2215/04* (2013.01); *C10M 2215/042* (2013.01); *C10M 2223/049* (2013.01); *C10N 2230/12* (2013.01); *C10N 2240/40* (2013.01); *C11D 1/722* (2013.01)

(58) Field of Classification Search

CPC ......... C10M 2215/042; C10N 2230/12; C23G 1/061; B23K 35/3612

USPC ............. 508/530; 252/392; 510/264; 148/22

See application file for complete search history.

(56) References Cited

U.S. PATENT DOCUMENTS

| | | | | |
|---|---|---|---|---|
| 3,365,661 A | 1/1968 | Zimmerman | | |
| 3,945,930 A * | 3/1976 | Sugiyama | C10M 173/00 | 508/431 |
| 6,525,005 B1 * | 2/2003 | Kravitz | C10M 173/02 | 508/438 |
| 2002/0006881 A1 | 1/2002 | Kravitz et al. | | |

FOREIGN PATENT DOCUMENTS

| | | |
|---|---|---|
| DE | 4444878 A1 | 6/1996 |
| DE | 19747895 A1 | 5/1999 |
| DE | 102007004325 A1 | 7/2008 |

(Continued)

OTHER PUBLICATIONS

International Search Report for PCT/EP2013/055074, 3 pages.
DIN 51360.

*Primary Examiner* — Vishal Vasisth
(74) *Attorney, Agent, or Firm* — Mary K. Cameron

(57) ABSTRACT

The present invention relates to a corrosion-protection system suitable for producing aqueous metal treatment and metal processing fluids, particularly corrosion-protection, cleaning and cooling lubricant emulsions. The corrosion-protection system comprises carbonic and/or phosphonic acids, as well as at least one amine with at least one oxybis(alkylamine) unit. Such corrosion-protection systems effectively protect metal surfaces from corrosion and have a high level of water solubility, which is essential for formulating aqueous concentrates for metal treatment and metal processing fluids. The present invention further relates to an aqueous surface-active and corrosion-protecting preparation containing the corrosion protection system and an emulsifier system, as well as an oil-containing water-miscible emulsion concentrate, which supplies the ready-to-use corrosion-protection, cleaning and cooling lubricant emulsions by dilution with water.

24 Claims, No Drawings

(56) References Cited

FOREIGN PATENT DOCUMENTS

| | | | |
|---|---|---|---|
| EP | 0656383 | A1 | 6/1995 |
| EP | 2083064 | A1 | 7/2009 |
| JP | 10324982 | A | 12/1998 |
| JP | 2005015617 | A | 8/2006 |

* cited by examiner

CORROSION-PROTECTION SYSTEM FOR TREATING METAL SURFACES

This application is a CON of PCT/EP2013/055074, filed Mar. 13, 2013.

The present invention relates to a corrosion protection system suitable for manufacturing aqueous metal-treatment and metal-processing liquids, in particular corrosion-protective, cleaning, and cooling-lubricant emulsions. The corrosion protection system comprises carboxylic and/or phosphonic acids as well as at least one amine having at least one oxybis(alkylamine) unit. Corrosion protection systems of this kind effectively protect metal surfaces from corrosion, and have a high degree of water solubility that is indispensable for the formulation of aqueous concentrates for metal-treatment and metal-processing liquids. The present invention further relates to an aqueous surface-active and corrosion-protective preparation containing the corrosion protection system and an emulsifier agent system, and to an oil-containing water-miscible emulsion concentrate that, by dilution with water, yields ready-to-use corrosion-protective, cleaning, and coolant-lubricant emulsions.

The protection of corrosion-susceptible metals such as iron, aluminum, zinc, copper, or alloys thereof from corrosion is a broad technical task. It arises in particular when the metal parts, as a result of their processing state or their area of utilization, are not or not yet covered with a permanently corrosion-protective coating, for example a paint. Examples thereof are metal parts during technical processing steps, for example material-removing or non-material-removing shaping or cleaning, as well as completed metal components such as heat exchangers or pipes that come into contact with corrosive aqueous media while functioning. In order to prevent or curb corrosion during or between the individual processing steps or during utilization as intended, the metal surfaces are brought into contact with corrosion inhibitors that effect temporary corrosion protection. For environmental protection reasons, it is often desirable for the corrosion inhibitors to be capable of being brought into contact with the metal surfaces in an aqueous phase. In addition, most metal-treatment or metal-processing liquids are based on aqueous preparations, so that the water solubility of a corrosion inhibitor is indispensable for formulation of these preparations. It is therefore a desirable property of corrosion inhibitors to be water soluble.

A plurality of inorganic and organic compounds are known as water-soluble corrosion inhibitors. Inorganic corrosion inhibitors can be based, for example, on chromates, nitrites, or phosphates, although these are more or less disadvantageous for toxicological and environmental reasons. Organic corrosion inhibitors are often based on carboxylates, amines, amides, or nitrogen-containing heterocyclic compounds. Carboxylic acids as such, however, prove not to have sufficient long-term effectiveness if, as a result of acid input into the inhibitor baths or microbiological processes, the pH is lowered sufficiently that the carboxylic acids are present not in salt form but in the less effective acid form. Corrosion-inhibiting carboxylic acids are therefore often used in the form of their salts or as a corrosion protection system made up of the carboxylic acid and a base. Corrosion protection systems made up of carboxylic acids and alkanolamines, which exhibit an elevated inhibitor effect as compared with systems comprising carboxylic acid and alkalis based on caustic soda or ammonia, are known in particular in the existing art.

DE 10 2007 004325 describes an emulsifier agent system for the manufacture of cooling lubricant emulsions that are suitable for being used in the processing of nonferrous metals or aluminum-alloyed metals. The emulsifier agent system here comprises a corrosion protection system made up of nonferrous-metal inhibitors such as carboxylic acids and phosphonic acids which, in order to avoid the black discoloration called "Brunnenschwärze," additionally contains chelate-forming tertiary organic amine compounds having phosphonic acid groups. The corrosion protection system furthermore contains alkanolamines, preferably mono- and trialkanolamines, as bases for the provision of particularly effectively inhibiting salts of carboxylic and phosphonic acids.

DE 4444878 discloses a water-soluble inhibitor system based on monocarboxylic acids and aromatic hydroxy compounds, having a pKs value for the hydroxy group in the range from 7.0 to 11, wherein the two components are at a specific weight ratio to one another.

DE 19747895 discloses a corrosion protection system for the neutral pH range, based on a combination of one or more carboxylic acids and one or more nitrogen compounds selected from organic amines or nitrogen-containing heterocycles, wherein the nitrogen compounds have a pKs value for at least one proteolysis step in the range from 6 to 9, wherein the two components are at a specific weight ratio to one another. Preferred nitrogen compounds can be selected, for example, from linear or cyclic alkylenediamines, alkylenetriamines, and alkylenetetramines.

An object of the present invention is to furnish a corrosion protection system, suitable for the manufacture of aqueous metal-treatment and metal-processing liquids, in particular cleaners and lubricants, that protects metals, in particular iron and iron alloys, from corrosion upon contact with the treatment and processing liquid more effectively as compared with the existing art.

This object is achieved by a corrosion protection suitable for aqueous metal-treatment and metal-processing liquids, comprising a) at least one aliphatic carboxylic acid having at least 6 but no more than 14 carbon atoms, and/or at least one carboxylic acid, having oxygen heteroatoms inserted into the carbon chain, that comprise between 6 and 26 atoms in the carbon-heteroatom chain, and/or at least one aliphatic phosphonic acid having at least 4 but no more than 18 carbon atoms, b) at least one amine that comprises at least one oxybis (alkylamine) unit having tertiary amino groups, the alkyl chains of said unit being made up in each case of no more than 4 carbon atoms.

The corrosion protection system according to the present invention produces outstanding protection for iron and iron alloys, as well as aluminum and aluminum alloys, against corrosion upon contact with aqueous liquids, in particular liquids for metal treatment or metal processing. The corrosion protection system is furthermore notable for its good water solubility, which allows the corrosion protection system to be marketed in the form of highly concentrated aqueous preparations.

Each preparation, for example a ready-to-use metal-treatment or metal-processing liquid or concentrate thereof, that contains the two components a) and b) thus also comprises the corrosion protection system according to the present invention. Usually a solution of the corrosion protection system is formulated into a metal-treatment or metal-processing liquid in order to impart the desired corrosion protection properties. For good compatibility with aqueous metal-treatment and metal-processing liquids, corrosion protection systems that stock components a) and b) in an aqueous phase are therefore preferred according to the present invention.

In a preferred corrosion protection system according to the present invention, at least one amine of the following structural formula (1)

(1)

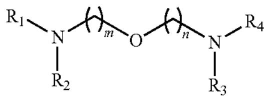

is contained as component b), wherein the residues $R_1$, $R_2$, $R_3$, and $R_4$ are selected mutually independently from branched or unbranched alkyl residues having no more than 8 carbon atoms and $-((CH_2)_o-X)_p-R_5$, wherein o is a natural integer in the range from 1 to 3, p is a natural integer in the range from 1 to 6, X is either an oxygen or nitrogen atom, and the residue $R_5$ is selected from hydrogen, methyl, ethyl, or propyl; having m and n as natural integers in the range from 1 to 3.

Alternatively, the residues $R_1$, $R_2$, $R_3$, and $R_4$ of the structural formula (1) can be selected from those residues which bridge the two nitrogen atoms of the oxybis(alkylamine) unit, so that the residue $R_1$ and/or the residue $R_2$ is respectively structurally identical to the residue $R_3$ or $R_4$, wherein bridging residues $R_1$ or R, or $R_3$ or $R_4$, are selected from alkylenes, polyoxyalkylenes, or polyaminoalkylenes having no more than 6 carbon atoms. A preferred bridging amine of this kind in a corrosion protection system according to the present invention has the following general structural formula (1a):

(1a)

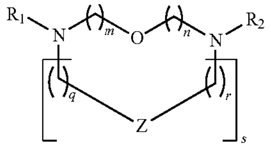

wherein the residues $R_1$ and $R_2$ are selected mutually independently from branched or unbranched alkyl residues having no more than 8 carbon atoms and $-((CH_2)_o-X)_p-R_5$, wherein o is a natural integer in the range from 1 to 3, p is a natural integer in the range from 1 to 6, X is either an oxygen or nitrogen atom, and the residue $R_5$ is selected from hydrogen, methyl, ethyl, or propyl; having m and n as natural integers in the range from 1 to 3;

and wherein q, r, and s are natural integers in the range from 1 to 3 and Z is either a carbon, oxygen, or nitrogen atom.

Amines of the structural formula (1a) for which the residues $R_1$ and $R_2$ are selected mutually independently from branched or unbranched alkyl residues having no more than 8 carbon atoms, preferably no more than 4 carbon atoms, for which m, n, q, and r are equal to 2, and s is no greater than 3, wherein Z is an oxygen or nitrogen atom, are particularly preferred. Particularly preferred bridging amines are N,N'-dimethyl-1,7-dioxa-4,10-diazacyclododecane, N,N'-diethyl-1,7-dioxa-4,10-diazacyclodecane, N,N'-dimethyl-1,4,10-trioxa-7,13-diazacyclopentadecane, and N,N'-diethyl-1,4,10-trioxa-7,13-diazacyclopentadecane.

Particularly preferably, the residues $R_1$, $R_2$, $R_3$, and $R_4$ of the structural formula (1) are selected mutually independently from branched or unbranched alkyl residues having no more than 8 carbon atoms, particularly preferably no more than 4 carbon atoms, wherein the natural integers m and n are equal to 2. N,N,N',N'-Tetramethyl-2,2'-oxybis(ethylamine) and N,N,N',N'-tetraethyl-2,2'-oxybis(ethylamine) are particularly preferred.

A preferred corrosion protection system according to the present invention contains at a proportion of at least 50 wt. %, particularly preferably at least 80 wt. %, only those organic amines in accordance with component b) which are selected from amines of the general structural formula (1) in accordance with component b), particularly preferably from those amines of the general structural formula (1) in accordance with component b) for which the residues $R_1$, $R_2$, $R_3$, and $R_4$ are mutually independently selected from branched or unbranched alkyl residues having no more than 4 carbon atoms, wherein the natural integers m and n are equal to 2, and are selected particularly preferably from N,N,N',N'-tetramethyl-2,2'-oxybis(ethylamine) and/or N,N,N',N'-tetraethyl-2,2'-oxybis(ethylamine).

The aliphatic carboxylic acids in accordance with component a) of the corrosion protection system according to the present invention, having at least 6 but no more than 14 carbon atoms, can be mono- or polybasic, saturated or unsaturated, linear or branched aliphatic carboxylic acids, but preferably they are selected from aliphatic monocarboxylic acids having at least 6 but no more than 12 carbon atoms, in particular from caprylic acid, ethylhexanoic acid, isononanoic acid, and/or isodecanoic acid.

It is preferred to select, as carboxylic acids in accordance with component a) having oxygen heteroatoms inserted into the carbon chain, ether carboxylic acids of the general formula $R-(O-C_2H_4)_n-OCH_2COOH$, wherein R denotes a linear or branched, saturated or unsaturated alkyl residue having 6 to 16 carbon atoms, n represents a number in the range from 1 to 5, and R and n are to be coordinated with one another so that the sum of the carbon atoms and oxygen atoms, ignoring the carboxyl group, is no greater than 25. The ether carboxylic acids can be technical mixtures of molecules having different residues R and different values for n. One example thereof is technical lauryl ether carboxylic acid, in which R denotes a mixture of linear, saturated alkyl groups having 12 and 14 carbon atoms, and n is approximately 2.5.

The aliphatic phosphonic acids contained in the corrosion protection system in accordance with component a), having at least 4 but no more than 18 carbon atoms, can be mono- or polybasic, saturated or unsaturated, linear or branched aliphatic phosphonic acids, but preferably they are selected from saturated straight-chain or branched monophosphonic acids. Mixtures of different acids can be particularly advantageous; the alkylmonophosphonic acids, particularly in their straight-chain form, are suitable. Alkylmonophosphonic acids having 6 to 12 carbon atoms are also suitable.

The use of carboxylic acids as component a) is to be preferred, for environmental reasons, whenever the use of phosphonic acids is not capable of significantly improving temporary corrosion protection in the context of metal treatment or metal processing.

In a preferred embodiment of the corrosion protection system according to the present invention, component a) is therefore selected from aliphatic monocarboxylic acids having at least 6 but no more than 12 carbon atoms, in particular from caprylic acid, ethylhexanoic acid, isononanoic acid, and/or isodecanoic acid, and/or carboxylic acids, having oxygen heteroatoms inserted into the carbon chain, that comprise between 6 and 26 atoms in the carbon-heteroatom chain, in particular ether carboxylic acids of the general formula $R—(O—C_2H_4)_n—OCH_2COOH$, wherein R denotes a linear or branched, saturated or unsaturated alkyl residue having 6 to 16 carbon atoms, n represents a number in the range from 1 to 5, and R and n are to be coordinated with one another so that the sum of the carbon atoms and oxygen atoms, ignoring the carboxyl group, is no greater than 25.

In a particularly preferred corrosion protection system, component a) is selected from aliphatic monocarboxylic acids having at least 6 but no more than 12 carbon atoms, in particular from caprylic acid, ethylhexanoic acid, isononanoic acid, and/or isodecanoic acid.

Particularly preferred in this regard is an embodiment of the corrosion protection system according to the present invention in which the weight-related proportion of carboxylic acids in accordance with component a) selected from aliphatic monocarboxylic acids having at least 6 but no more than 12 carbon atoms, in particular the weight-related proportion of caprylic acid, ethylhexanoic acid, isononanoic acid, and/or isodecanoic acid, in terms of the total proportion of carboxylic acids and phosphonic acids in the corrosion protection system, i.e. including those carboxylic acids and phosphonic acids which are not compounds in accordance with component a), is at least 50 wt. %, particularly preferably at least 80 wt. %.

It is known to one skilled in the art that components a) and b) of the corrosion protection system can enter into acid-base reactions with one another, and furthermore in aqueous solution are in protolysis equilibrium with their respective deprotonated or protonated form.

It has been found in this connection that both water solubility and the corrosion protection effect are positively influenced by the presence of ammonium salts that proceed from the neutralization reaction of components a) and b). It is therefore preferred according to the present invention that the molar ratio of the total quantity of carboxyl groups and/or phosphonic acid groups of components a) to oxybis(alkylamine) units of the at least one amine of component b) is no less than 1:3, in order to ensure that a minimum quantity of amine in accordance with component b) is present as an ammonium salt in the corrosion protection system according to the present invention. Particularly preferably this molar ratio is no less than 2:3. Conversely, the total quantity of carboxyl groups and/or phosphonic acid groups of components a) relative to the proportion of amines in accordance with component b) should not exceed values at which the effectiveness of the corrosion protection according to the present invention appreciably decreases. It is preferred according to the present invention for this purpose that the molar ratio of the total quantity of carboxyl groups and/or phosphonic acid groups of components a) to oxybis(alkylamine) units of the at least one amine of component b) be no greater than 5:1, particularly preferably no greater than 3:1, especially preferably no greater than 2:1.

In a further aspect, the present invention relates to the use of the previously described corrosion protection system in aqueous systems for metal processing and metal treatment. The corrosion protection system according to the present invention is suitable to a particular extent for use in aqueous emulsions, especially in cleaning, corrosion-protection, and cooling-lubricant emulsions, in order to prevent metal corrosion. An advantage of the use according to the present invention of a corrosion protection system based on components a) and b) is that for sufficient corrosion protection, a comparatively small quantity of these two active components needs to be present in the aqueous system for metal processing and metal treatment.

The present invention therefore likewise comprises an aqueous surface-active and corrosion-protective preparation that contains, besides water and the previously described corrosion protection system containing components a) and b), hereinafter referred to as "corrosion protection system (I)," an emulsifier agent system (II) made up of c) ethoxylates/propoxylates of fatty alcohols having 8 to 18 carbon atoms in the alcohol, having 2 to 6 ethylene oxide units and 4 to 8 propylene oxide units, and
d) fatty alcohols and/or fatty alcohol propoxylates having 12 to 24 carbon atoms in the alcohol and 0 to 3 propylene oxide units, and/or of the distillation residuum of said fatty alcohols.

In a further aspect, the emulsifier agent system (II) of the aqueous surface-active and corrosion-protective preparation according to the present invention additionally contains alkoxylated fatty amines as component e) in order to improve the ability to filter emulsions produced from said preparations. It is preferred to use for this alkoxylated fatty amines made up of one or more alkoxylated saturated and/or unsaturated aliphatic amines having an aliphatic chain length of at least 8, preferably at least 10, and particularly preferably at least 12, but no more than 20, preferably no more than 18, and particularly preferably no more than 16 carbon atoms. The fatty amines used should be ethoxylated with at least 8, preferably with at least 10, but with no more than 16, preferably with no more than 14, and particularly preferably with 12 ethylene oxide units. Twelve-fold ethoxylated coco amine is particularly suitable for increasing the ability to filter ready-to-use emulsions produced from these preparations.

For a ready-to-use corrosion-protective cleaner solution, the proportion of components a) to e) in the preparation according to the present invention is preferably in the range from 0.5 to 10 wt. %, wherein the total proportion of components a) and b) of the corrosion protection system (I) is preferably at least 0.1 wt. %.

The preparation according to the present invention can, however, also represent a concentrate for the production of corrosion-protective cleaner solutions, in which concentrate the proportion of components a) to e) is preferably in the range from 40 to 95 wt. %, wherein the total proportion of components a) and b) of the corrosion protection system (I) in the preparation according to the present invention is preferably at least 10 wt. %.

The aqueous surface-active and corrosion-protective preparation, constituting a concentrate having a water proportion of no more than 60 wt. %, can additionally have an oil component (III) added to it, so that what is present is implemented as an oil-containing, water-miscible emulsion concentrate for metal processing, in particular a concentrate for a coolant-lubricant or corrosion-protective emulsion.

The present invention therefore also relates to an oil-containing water-miscible emulsion concentrate containing i) 2 to 20 wt. % of a corrosion protection system (I) made up of
   a) at least one aliphatic carboxylic acid having at least 6 but no more than 14 carbon atoms, and/or at least one carboxylic acid, having oxygen heteroatoms inserted into the carbon chain, that comprise between 6 and 26 atoms in the carbon-heteroatom chain, and/or at least one aliphatic phosphoric acid having at least 4 but no more than 18 carbon atoms,
   b) at least one amine that comprises at least one oxybis(alkylamine) unit having tertiary amino groups, the alkyl chains of said unit being made up in each case of no more than 4 carbon atoms wherein the weight ratio of components a) and b) can vary from 1:0.2 to 0.3:1, ii) 2 to 50 wt. % of an emulsifier agent system (II) made up of c) ethoxylates/propoxylates of fatty alcohols having 8 to 18 carbon atoms in the alcohol, having 2 to 6 ethylene oxide units and 4 to 8 propylene oxide units, and d) fatty alcohols and/or fatty alcohol propoxylates having 12 to 24 carbon atoms in the alcohol and 0 to 3 propylene oxide units, and/or of the distillation residuum of said fatty alcohols, wherein the weight ratio of components c) and d) can vary from 1:0.3 to 0.3:1, and iii) 5 to 50 wt. % of an oil component (III), and optionally further adjuvants and active agents (IV), wherein the sum of the constituents I) to IV) adds up to 60 to 95 wt. % and the remaining weight proportion represents water.

With regard to the corrosion protection system (I) and emulsifier agent system (II) of the oil-containing, water-miscible emulsion concentrate according to the present invention, the preferred embodiments are identical to those that have been described for the corrosion protection system according to the present invention and for the aqueous surface-active and corrosion-protective preparation according to the present invention.

The emulsifier agent system (II) of the oil-containing, water-miscible emulsion concentrate according to the present invention can in that regard, as described previously for the aqueous surface-active and corrosion-protective preparation, contain alkoxylated fatty amines as component e), preferably at a weight proportion in the concentrate of at least 1 wt. %, particularly preferably at least 2 wt. %, but preferably no more than 10 wt. %, particularly preferably no more than 8 wt %.

The oil component (III) of the oil-containing, water-miscible emulsion concentrate according to the present invention is preferably selected from paraffinic or naphthenic mineral oils, dialkyl ethers having 12 to 20 carbon atoms, and/or ester oils.

To be recited as optional further adjuvants or active agents are: lubrication additives in general, and in particular so-called "extreme pressure" (EP) additives, as well as biocides, each in a quantity from preferably 0.1 to 2 wt. % in the concentrate; buffer systems, in particular based on boric acid, in a quantity, based on the respective acid form, from preferably 2 to 10 wt. % in the concentrate; neutralizing agents based on alkanolamines, solubilizers such as glycols, glycerol, or sodium cumolsulfonate, each in a quantity preferably from 1 to 6 wt. % in the concentrate.

The invention further relates to the ready-to-use oil-in-water emulsion that is obtainable by adding approximately 99.5 to 90 parts by weight water to approximately 0.5 to approximately 10 parts by weight of the above-described oil-containing, water-miscible concentrate. Because of the self-emulsifying properties of the emulsion concentrate, the ready-to-use emulsion forms spontaneously or after slight mechanical movement, such as stirring, upon the addition of water. This emulsion can be used, for example, as a cleaning, corrosion-protective, or coolant-lubricant emulsion.

The oil-containing, water-miscible emulsion concentrate according to the present invention and the ready-to-use oil-in-water emulsions producible therefrom by dilution with water are suitable in particular for the treatment and processing of iron and iron allows as well as aluminum and aluminum alloys.

EXEMPLIFYING EMBODIMENTS

The mode of operation of the corrosion protection systems according to the present invention is presented below by way of example, and compared with systems known in the existing art. For this a corrosion protection test per DIN 51360-2 is performed, in which cast-iron chips (type GG25) are wetted on a round filter with freshly manufactured dilute aqueous solutions containing various corrosion protection systems based on an amine and isononanoic acid.

Table 1 lists the compositions of concentrated aqueous corrosion protection systems (stock solutions) based on an amine and isononanoic acid.

TABLE 1

Stock solutions of corrosion protection systems each having an active-component proportion of 20 wt. % in water having a hardness of 20° dH (3.04 mmol $CaCl_2$; 0.54 mmol $MgSO_4$)

| | Amine component | wt. % | Carboxylic acid | wt. % |
|---|---|---|---|---|
| B1 | N,N,N',N'-tetramethyl-2,2'-oxybis(ethylamine) | 10.07 | Isononanoic acid | 9.93 |
| V1 | Monoethanolamine | 5.57 | Isononanoic acid | 14.43 |
| V2 | Triethanolamine | 9.71 | Isononanoic acid | 10.29 |
| V3 | N,N,N',N'-tetramethyl-1,6-hexamethylenediamine | 10.43 | Isononanoic acid | 9.57 |

The stock solutions of Table 1 were further diluted with water having a hardness of 20° dH (3.04 mmol $CaCl_2$; 0.54 mmol $MgSO_4$), and the cast-iron chips on the filter paper were wetted with this dilute solution.

Table 2 reproduces the degree of rust formation as a function of the active content of the solutions, based on an assessment of corrosion marks on the filter paper after the chips had been exposed for two hours at 20° C.

Based on the corrosion results presented in Table 2, it is apparent that the corrosion protection system according to the present invention containing the amine having an oxybis (alkylamine) unit exhibits an appreciable corrosion protection effect starting at a weight proportion of only 6% based on the stock solution B1. At a weight proportion of at least 7% based on the stock solution B1, only slight corrosion phenomena are detectable on the filter paper, while for the remaining corrosion protection systems moderate (V3) to severe (V1, V2) corrosion can still be observed. The corrosion protection system (B1) according to the present invention containing the amine having the oxybis(alkylamine) unit is also superior to the corrosion protection system (V3) containing the hexamethylene-bridged tertiary diamine.

TABLE 2

Corrosion results from filter test per DIN 51 360 of two samples in each case of cast-iron chips (type GG25) that had been brought into contact with variously diluted stock solutions in accordance with Table 1.

| | Proportion of stock solution (wt. %) | | | |
|---|---|---|---|---|
| | 5 | 6 | 7 | 8 |
| B1 | 4/4 | 3/3 | 2/1 | 0/0 |
| V1 | 4/4 | 4/4 | 4/4 | 2/2 |

TABLE 2-continued

Corrosion results from filter test per DIN 51 360 of two samples in each case of cast-iron chips (type GG25) that had been brought into contact with variously diluted stock solutions in accordance with Table 1.

| | Proportion of stock solution (wt. %) | | | |
|---|---|---|---|---|
| | 5 | 6 | 7 | 8 |
| V2 | 4/4 | 4/4 | 4/4 | 4/4 |
| V3 | 4/4 | 4/4 | 3/3 | 1/1 |

Corrosion assessment per DIN 51 360:

0 no corrosion/unchanged

1 traces of corrosion/maximum 3 corrosion marks

2 slight corrosion/no more than 1% of surface discolored

3 moderate corrosion/no more than 5% of surface discolored

4 severe corrosion/more than 5% of surface discolored.

What is claimed is:

1. A corrosion protection system for the manufacture of aqueous metal-treatment and metal-processing liquids, comprising a) one or more acids selected from the group consisting of carboxylic acids, having a carbon chain and oxygen heteroatoms inserted into the carbon chain, that comprise between 6 and 26 atoms in the carbon-heteroatom chain, one or more aliphatic straight chain monophosphonic acids having at least 6 but no more than 12 carbon atoms and combinations thereof; and b) at least one amine that comprises at least one oxybis (alkylamine) unit having tertiary amino groups, the alkyl chains of said unit being made up in each case of no more than 4 carbon atoms;

wherein the corrosion protection system has a molar ratio of total quantity of acid groups of component a) to oxybis(alkylamine) units of the at least one amine of component b) that is no greater than 5:1, but no less than 1:3.

2. The corrosion protection system according to claim 1, wherein component b) comprises at least one amine of structural formula (1):

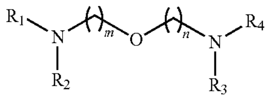

(1)

where m and n are natural integers in a range from 1 to 3; and where residues $R_1$, $R_2$, $R_3$, and $R_4$ are selected mutually independently from branched or unbranched alkyl residues having no more than 8 carbon atoms and $-((CH_2)_x-O)_y-R_5$, wherein x is a natural integer in the range from 1 to 3, y is a natural integer in the range from 1 to 6, and the residue $R_5$ is selected from hydrogen, methyl, ethyl, or propyl.

3. The corrosion protection system according to claim 2, wherein component b) comprises at least one amine of the structural formula (1) wherein the residues $R_1$, $R_2$, $R_3$, and $R_4$ are selected mutually independently from branched or unbranched alkyl residues having no more than 8 carbon atoms, and in which the natural integers m and n are equal to 2.

4. The corrosion protection system according to claim 2, wherein at least 50 wt. % of component b) is comprised of the at least one amine of structural formula (1), based on total proportion of amines of component b).

5. The corrosion protection system according to claim 4, wherein at least 80 wt. % of component b) is comprised of the at least one amine of structural formula (1), based on total proportion of amines of component b).

6. The corrosion protection system according to claim 2, wherein at least 50 wt. % of component b), based on total proportion of amines of component b), is comprised of the at least one amine of the structural formula (1) wherein the residues $R_1$, $R_2$, $R_3$, and $R_4$ are selected mutually independently from branched or unbranched alkyl residues having no more than 8 carbon atoms, and in which the natural integers m and n are equal to 2.

7. The corrosion protection system according to claim 2, wherein at least 80 wt. % of component b), based on total proportion of amines of component b), is comprised of the at least one amine of the structural formula (1) wherein the residues $R_1$, $R_2$, $R_3$, and $R_4$ are selected mutually independently from branched or unbranched alkyl residues having no more than 8 carbon atoms, and in which the natural integers m and n are equal to 2.

8. The corrosion protection system according to claim 1, further comprising one or more aliphatic branched or unbranched monocarboxylic acids.

9. The corrosion protection system according to claim 8, wherein the aliphatic branched or unbranched monocarboxylic acids are selected from caprylic acid, ethylhexanoic acid, isononanoic acid, isodecanoic acid and mixtures thereof.

10. The corrosion protection system according to claim 1, wherein the corrosion protection system has a molar ratio of total quantity of acid groups of component a) to oxybis (alkylamine) units of the at least one amine of component b) that is no greater than 2:1, but no less than 2:3.

11. A method of using a corrosion protection system comprising steps of:

a) providing a corrosion protection system according to claim 1 b) mixing the corrosion protection system with a liquid for metal treatment or metal processing selected from cleaning, corrosion-protection, and cooling-lubricant emulsions.

12. An aqueous surface-active and corrosion-protective preparation comprising, besides water:

i) corrosion protection system (I) in accordance with claim 1; wherein the corrosion protection system has a molar ratio of total quantity of acid groups of component a) to oxybis(alkylamine) units of the at least one amine of component b) that is no greater than 3:1, but no less than 1:3; and ii) an emulsifier system (II) comprising:

a) component a) selected from the group consisting of ethoxylates/propoxylates of fatty alcohols, said fatty alcohols having 8 to 18 carbon atoms, having 2 to 6 ethylene oxide units and 4 to 8 propylene oxide units; and b) component b) selected from the group consisting of fatty alcohols having 12 to 24 carbon atoms, fatty alcohol propoxylates having 12 to 24 carbon atoms in the alcohol and 1 to 3 propylene oxide units, distillation residuum of said fatty alcohols and mixtures thereof.

13. An oil-containing water-miscible emulsion concentrate comprising:

i) 2 to 20 wt. % of the corrosion protection system (I) in accordance with claim 1, having a weight ratio of components a) to b) ranging from 1:0.2 to 0.3:1;

ii) 2 to 50 wt. % of an emulsifier system (II) comprising:

a. ethoxylates/propoxylates of fatty alcohols, said fatty alcohols having 8 to 18 carbon atoms, having 2 to 6 ethylene oxide units and 4 to 8 propylene oxide units; and b. fatty alcohols having 12 to 24 carbon atoms, and/or fatty alcohol propoxylates having 12 to 24 carbon atoms in the alcohol and 0 to 3 propylene oxide units, and/or distillation residuum of said fatty alcohols;

wherein components c and d have a weight ratio from 1:0.3 to 0.3:1; and iii) 5 to 50 wt. % of an oil component (III), and optionally further adjuvants and active agents (IV), wherein amounts of I) to IV) add up to 60 to 95 wt. % of the concentrate, and any remaining weight proportion represents water.

14. The oil-containing water-miscible emulsion concentrate of claim 13, wherein oil component (III) is selected from paraffinic mineral oil, naphthenic mineral oil, dialkyl ethers having 12 to 20 carbon atoms, and ester oils and combinations thereof.

15. An aqueous surface-active and corrosion-protective preparation comprising, besides water:

i) a corrosion protection system (I) comprising:

a) one or more acids selected from the group consisting of carboxylic acids, having a carboxyl group and a carbon chain with oxygen heteroatoms inserted into the carbon chain, that comprise between 6 and 26 atoms in the carbon-heteroatom chain; aliphatic straight chain monophosphonic acids having at least 6 but no more than 12 carbon atoms and combinations thereof; and b) at least one amine that comprises at least one oxybis(alkylamine) unit having tertiary amino groups, the alkyl chains of said unit being made up in each case of no more than 4 carbon atoms;

wherein the corrosion protection system has a molar ratio of total quantity of acid groups of component a) to oxybis(alkylamine) units of the at least one amine of component b) that is no greater than 5:1, but no less than 1:3; and ii) an emulsifier system (II) comprising:

c) ethoxylates/propoxylates of fatty alcohols, said fatty alcohols having 8 to 18 carbon atoms, having 2 to 6 ethylene oxide units and 4 to 8 propylene oxide units; and d) one or more selected from the group consisting of fatty alcohols having 12 to 24 carbon atoms; fatty alcohol propoxylates having 12 to 24 carbon atoms in the alcohol and up to 3 propylene oxide units; distillation residuum of said fatty alcohols and mixtures thereof.

16. The aqueous surface-active and corrosion-protective preparation of claim 15, the corrosion protection system (I) further comprises one or more aliphatic branched or unbranched monocarboxylic acids selected from caprylic acid, ethylhexanoic acid, isononanoic acid, isodecanoic acid and mixtures thereof; and the emulsifier system (II) further comprises component e) alkoxylated fatty amines selected from the group consisting of saturated and unsaturated aliphatic amines having an aliphatic chain length of at least 8, but no more than 20 carbon atoms, optionally said alkoxylated fatty amines include ethoxylated fatty amines having at least 8, but no more than 16 ethylene oxide units.

17. The corrosion protection system according to claim 1, wherein component b) comprises at least one amine of structural formula (1):

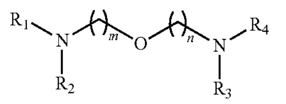

(1)

where m and n are natural integers in a range from 1 to 3; and where residues $R_1$, $R_2$, $R_3$, and $R_4$ are selected from those residues which bridge the two nitrogen atoms of the oxybis(alkylamine) unit, such that the residue $R_1$ or the residue $R_2$ is respectively structurally identical to the residue $R_3$ or $R_4$, wherein bridging residues $R_1$ or $R_2$, or $R_3$ or $R_4$, are selected from polyoxyalkylenes or polyaminoalkylenes having no more than 6 carbon atoms.

18. The corrosion protection system according to claim 1, wherein component b) comprises at least one amine of structural formula (1a):

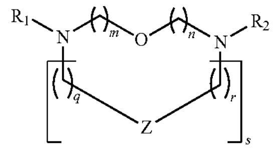

(1a)

wherein m and n are natural integers in the range from 1 to 3;

q, r, and s are natural integers in the range from 1 to 3 and Z is either a carbon, oxygen, or nitrogen atom; and the residues $R_1$ and $R_2$ are selected mutually independently from:

alkyl residues, which may be branched or unbranched, having no more than 8 carbon atoms; and $((CH_2)_o—X)_p—R_5$, wherein o is a natural integer in the range from 1 to 3, p is a natural integer in the range from 1 to 6, X is either an oxygen or nitrogen atom, and the residue $R_5$ is selected from hydrogen, methyl, ethyl, or propyl.

19. The corrosion protection system according to claim 1, further comprising one or more aliphatic branched or unbranched monocarboxylic acids; wherein component b) comprises at least one bridging amine selected from the group consisting of N,N'-dimethyl-1,7-dioxa-4,10-diazacyclododecane, N,N'-diethyl-1,7-dioxa-4,10-diazacyclodecane, N,N'-dimethyl-1,4,10-trioxa-7,13-diazacyclopentadecane, and N,N'-diethyl-1,4,10-trioxa-7,13-diazacyclopentadecane.

20. The corrosion protection system according to claim 2, wherein at least one of the residues $R_1$, $R_2$, $R_3$, and $R_4$ is $—((CH_2)_x—O)_y—R_5$.

21. A corrosion protection system for the manufacture of aqueous metal-treatment and metal-processing liquids, comprising:

a) one or more carboxylic acids, having a carbon chain and oxygen heteroatoms inserted into the carbon chain, that comprise between 6 and 26 atoms in the carbon-heteroatom chain, and one or more aliphatic straight chain monophosphonic acids having at least 6 and no more than 12 carbon atoms; and b) at least one amine that comprises at least one oxybis (alkylamine) unit having tertiary amino groups, the alkyl chains of said unit being made up in each case of no more than 4 carbon atoms.

22. The corrosion protection system according to claim 21, wherein component a) includes ether carboxylic acids having a general formula:

$$R—(O—C_2H_4)_n—OCH_2COOH$$

wherein R denotes a linear or branched, saturated or unsaturated alkyl residue having 6 to 16 carbon atoms, and n represents a number in a range from 1 to 5.

23. The corrosion protection system according to claim 22, wherein the ether carboxylic acids include technical lauryl ether carboxylic acid, in which R denotes a mixture of linear, saturated alkyl groups having 12 and 14 carbon atoms, and n is approximately 2.5.

24. The corrosion protection system according to claim 1, wherein component b) comprises N,N,N',N'-tetramethyl-2, 2'-oxybis(ethylamine).

* * * * *